March 8, 1932.    C. L. KENNICOTT ET AL    1,848,354
PROCESS AND APPARATUS FOR MOLDING SLABS
Filed Oct. 19, 1928    3 Sheets-Sheet 2
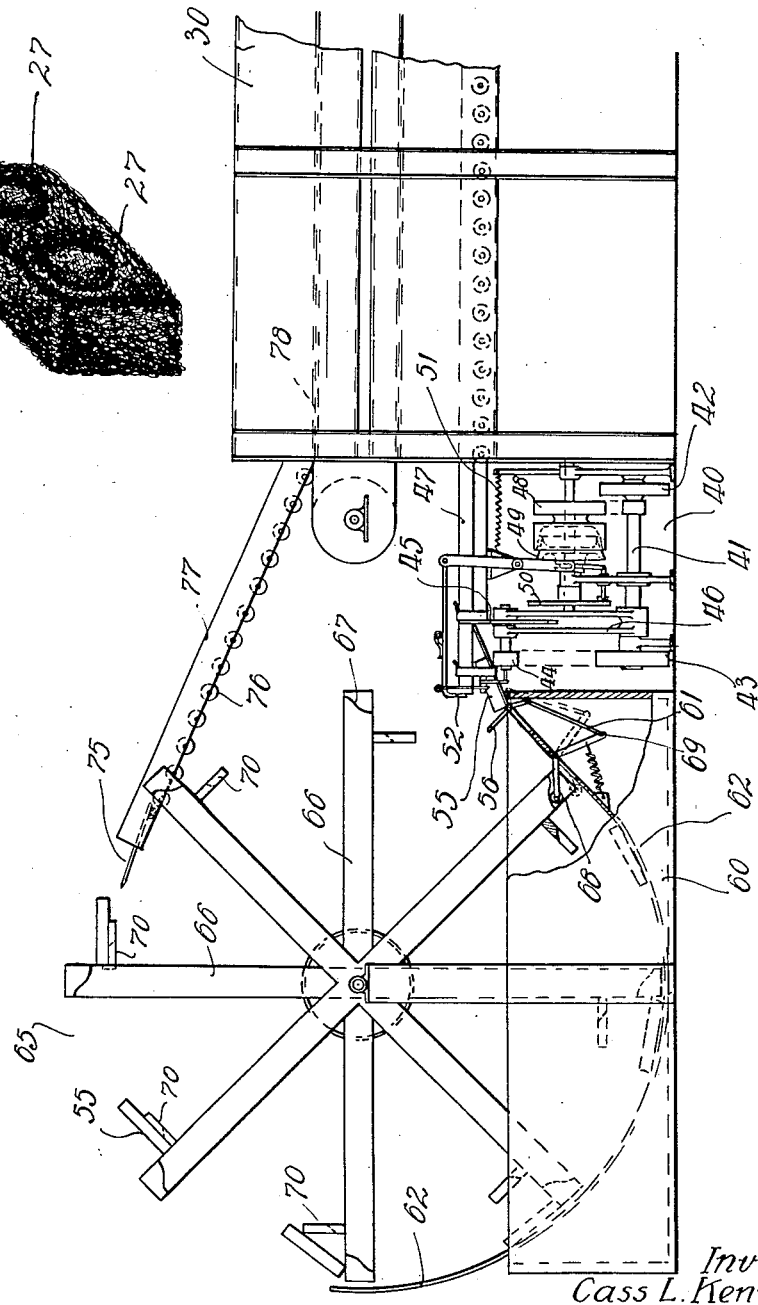
Inventors
Cass L. Kennicott
Herbert Libberton
By Brown Jackson Boettcher & Dienner
Attys.

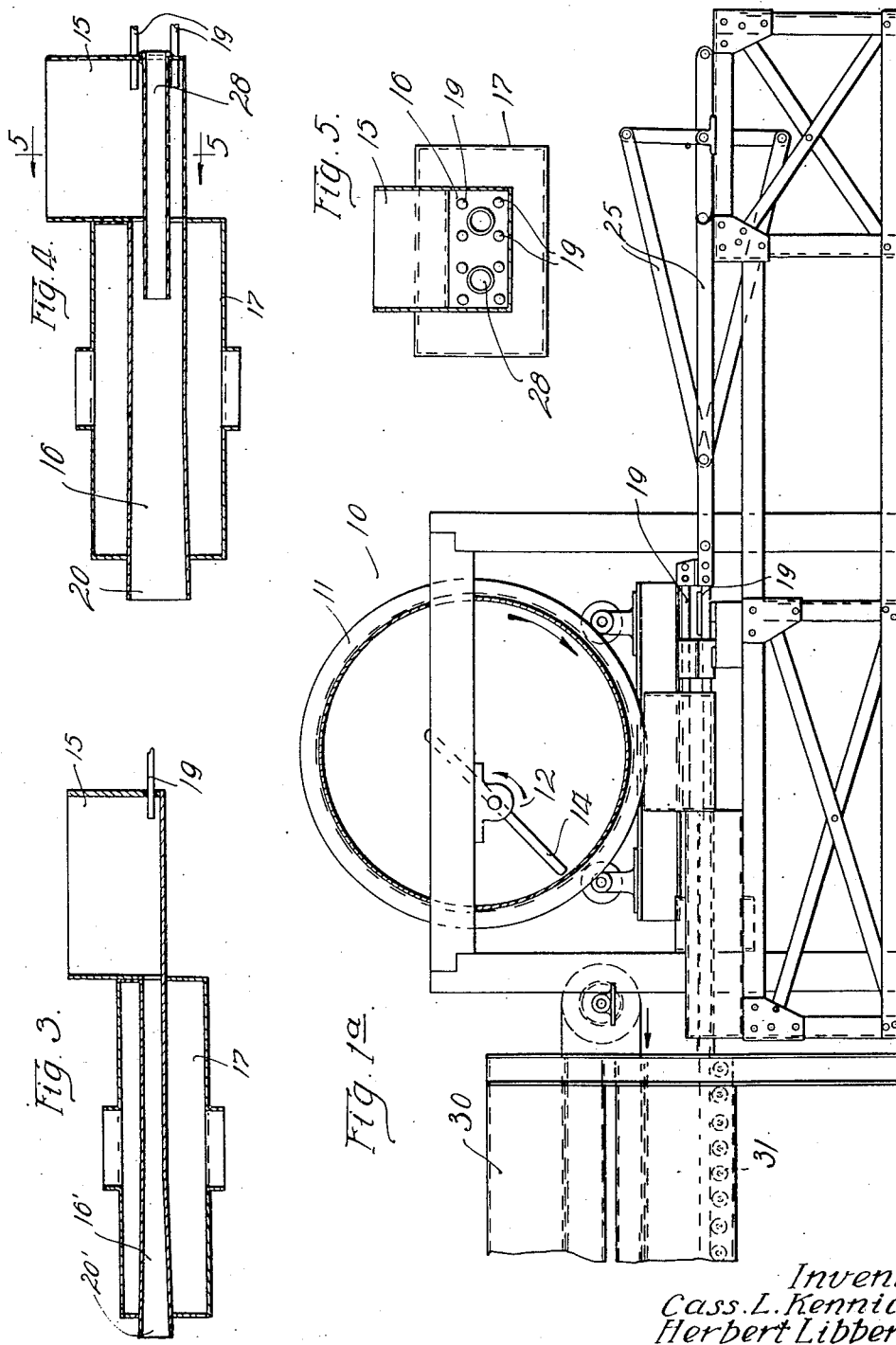

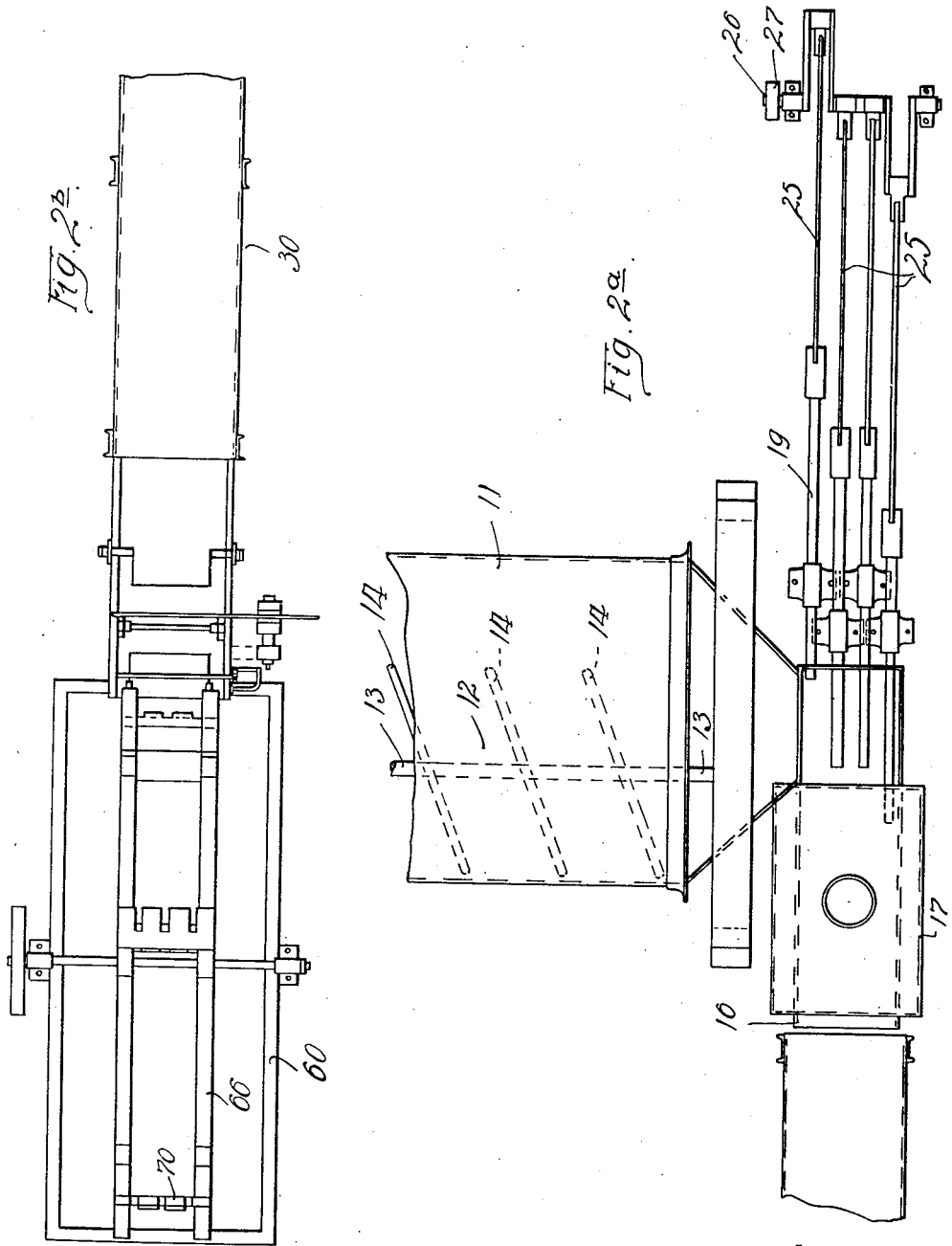

Patented Mar. 8, 1932

1,848,354

UNITED STATES PATENT OFFICE

CASS L. KENNICOTT, OF FLOSSMOOR, AND HERBERT LIBBERTON, OF CHICAGO, ILLINOIS, ASSIGNORS TO THE SOUNDEX CORPORATION, OF CHICAGO, ILLINOIS, A CORPORATION OF ILLINOIS

PROCESS AND APPARATUS FOR MOLDING SLABS

Application filed October 19, 1928. Serial No. 313,402.

This invention relates to the manufacture of light weight building material and it is an object of this invention to provide a new building material having certain desired characteristics more fully pointed out below. This building material may be made in the form of blocks, slabs or of any other desired shape.

It is an object of our invention to provide a building block having the qualities of the light weight fibrous building blocks now known and which, in addition to being inexpensive to manufacture is 1. Permanent.
2. Water resistant.
3. Fire resistant.
4. Not softened by heat.
5. Not affected by gypsum, lime plaster, or Portland cement.

We have found that a block formed of vegetable fibre such as excelsior, wood wool, or the like, bound together by some adhesive, such for instance as silicate of soda mixed with carbonate of lime or magnesia, or both, then dipped in what may be called a "setting solution" has all the characteristics above enumerated. The setting solution may consist of any chemical that unites with calcium silicate and renders it insoluble in water. Instead of a liquid solution suitable gases may be used to obtain the equivalent results.

We have found that a cement or adhesive consisting of a base of high ratio sodium silicate is particularly applicable for use in forming blocks in molds, due to its ability to set quickly when subjected to heat. Since the material is a good heat insulator some time would be required to heat the fibrous block throughout. We have developed a novel method of molding the material, which method utilizes the property of the material to set quickly when heated and at the same time eliminates the necessity of heating the blocks throughout while the blocks are in the molds.

The main feature of our invention resides in treating the block to form a skin upon the outside thereof of sufficient strength to permit removal of the block from the mold without change of shape of the block.

In the practice of our invention, this is done by employing a cement which has the property of rapidly setting when heated and by heating the molds in which the blocks are contained.

The formation of a skin or shell upon the outside of the block permits the block to be taken out of the mold before the block is thoroughly hardened or set, but it frees the mold so that much greater production can be secured from a set of molds than by any known process of the prior art.

We have further developed a process for making the blocks by a continuous operation, and have also invented a machine for carrying out the process.

The attainment of the above and other objects of this invention will be apparent from the following specification taken in conjunction with the accompanying drawings forming a part thereof.

In the drawings:

Figs. 1a and 1b when placed end to end with Fig. 1b at the left of Fig. 1a, constitute a side view of our mold machine equipment;

Figs. 2a and 2b are plan views of our machine and correspond respectively to Figs. 1a and 1b;

Figs. 3 and 4 are fragmentary sections showing two different forms of extruder nozzles used to form blocks of different shapes;

Fig. 5 is a section taken along the line 5—5 of Fig. 4; and

Fig. 6 is a perspective view showing one of our finished blocks.

Our block is made up of fibrous material such as excelsior, wood wool, or other vegetable fibre held together by a suitable adhesive, which is subsequently treated to render it insoluble. In the preferred form of the invention, the ingredients are mixed in the following proportions (by weight), 3 parts or excelsior, 5 parts of sodium silicate of a ratio of 1 to 3.25, 7½ parts of calcium carbonate finely ground, and 1.6 parts of water. By the ratio 1 to 3.25 of sodium silicate, we mean a mixture of sodium oxide ($Na_2O$) and silicon dioxide ($SiO_2$) in the ratio of 1 part of sodium oxide at 3.25 parts of silicon dioxide. This ratio of 1 to 3.25 is not an exact ratio and may be rather widely varied without appreciably affecting the results obtained. Instead of excelsior, wood wool or other vegetable fibre may be used. The batch is then thoroughly mixed so as to break up compacted masses and to coat each individual fibre with the binder of sodium silicate and calcium carbonate. In place of calcium carbonate magnesium carbonate may be used, or we may use a mixture of calcium carbonate and magnesium carbonate.

After the batch of material has been thoroughly mixed, it is formed into the desired shape by molding although other processes may be used.

We have found that a cement or adhesive consisting of a base of high ratio sodium silicate is particularly applicable for use in forming blocks in molds, due to its ability to set quickly. At high temperatures this material sets very quickly. Since the material is a good heat insulator some time would be required to heat the fibrous blocks throughout. We have developed a way of molding the material that eliminates the necessity of retaining the blocks in the molds during the entire setting period. By heating the walls of the mold, the material adjacent the walls is caused to set very quickly forming a skin of sufficient strength to retain the shape of the block and permit the removal of the same from the form or mold. The block may then be heated in an oven to cause it to set quickly. The mold is thus freed for further use while the block is setting and, further, because of the removal of the mold from around the block, the heating is more effective since the free circulation of air throughout the block is permitted.

Because of the characteristics of this material to set very quickly when in contact with the hot walls of a mold, and to thus produce a form sustaining skin while the material within is still plastic, it is possible to mold this material in a novel manner having certain obvious advantages.

The material may be forced through an extruder nozzle or a short length of pipe having a cross section such as is required in the finished product. If the walls of the nozzle or extruder are heated the material adjacent the walls sets quickly as the material is pushed through the extruder and provides a form sustaining skin which retains the shape of the extruded material while the plastic material on the inside is setting. The material may be continuously extruded through the nozzle or extruder to form a long column which may then be cut into sections of suitable length.

In case it is desired to form the fibrous unit with holes of any desired shape, this may be done by providing pipes or tubes in the extruder or forming nozzle, and to assist in the drying of the unit as it leaves the extruder or forming nozzle, hot air is blown through these tubes. As the column formed with the holes passes beyond the range of the tubes or pipes the hot air then passes into the holes and permeates through the interstitial spaces in the column of material being retained in these spaces until the column passes beyond the range of the mold or extruder when the air slowly seeps out from the outer sides of the column of material.

The temperature to which the material is heated to cause it to set quickly should be as high as possible without charring the excelsior. The temperature should not exceed 400 degrees Fahrenheit and, for the sake of safety, should probably be in the neighborhood of 350 degrees Fahrenheit.

After the block has been formed, it is chemically treated to render the sodium silicate insoluble. This is done by dipping the block into what may be termed a setting solution. A 5% solution of either iron sulphate or iron chloride or chloride of ammonium or sulphate of alumina is suitable for this purpose.

Instead of a liquid solution, the block may be treated with any gas or vapor such as ammonium chloride, chlorine, or carbon dioxide. In fact, so far as we can determine, any chemical which neutralizes the caustic soda seems to be satisfactory for our purposes. Expense is the main item, and of all the above mentioned materials, we have found that while sulphate of iron seems to be the cheapest, chloride of ammonium is probably the most suitable for our purposes.

A description will now be given of our novel machine for carrying out our method of making building blocks as above described. The materials comprising excelsior, sodium silicate, calcium carbonate, and water in the proper proportions as outlined above, are placed into a mixer 10 which is of standard construction and forms no part of our present invention. In general, the mixer comprises a drum 11 into which the material is placed and which is rotated in a clockwise direction as seen in Fig. 1a at a relatively low speed of about 21 revolutions per minute. Within the drum there is placed a beater 12 which rotates in a counter-clockwise direction at a relatively high speed of about 400 revolutions per minute. The beater 12 may comprise nothing more than a rod 13 carrying a number of spaced angularly disposed prongs 14. The material within the drum is thoroughly mixed and is constantly fed forward through a hopper 15 to an extruder such as is shown for instance in Figs. 4 and 5.

The extruder comprises a nozzle of a suitable cross section into which the bottom of the hopper 15 opens. The nozzle 16 shown in Figs. 4 and 5 is a rectangular cross section as may be seen in Fig. 5. The extruder 16 is surrounded by a jacket 17 through which hot air is circulated in order to heat the extruder. Instead of air, hot liquids may be circulated through the jacket. The liquid used may be a molten metal or alloy, having a suitable melting point (about 350° F. to 400° F.), or other liquids, such as oils, may be used. The material is forced from the hopper 15 through the extruder 16 by means of a number of tampers or plunger rods 19 in a manner to be presently explained. The extruder 16 tapers outwardly from the hopper 15 to its opposite end 20 so that it is of a very slightly greater section at the end 20 than it is at the end that enters into the hopper 15. This is provided in order to permit a free passage of the material through the end of the extruder after a form sustaining skin has formed on the outside of the material due to its contact with the hot walls of the extruder.

The plunger rods 19 may be spaced with respect to the extruder 16 in any suitable manner, such for instance as shown in Fig. 5, and are reciprocated by the connecting rods 25 connected to the arms on the constantly rotating crank shaft 26. The crank shaft may be rotated by means of a belt passing over the pulley 27 or it may be rotated in any other well known manner. The extruder shown in Figs. 4 and 5 is adapted to form a block having a section such as shown in Fig. 6, the two holes 27 extending through the block.

In order to form the holes in the molded article, two pipes 28 extend for a short distance into the extruder 16, and the plungers 19 force the plastic material through the extruder around those pipes. Hot gases are blown through the pipes 28 thereby producing a rather rapid setting of the plastic material that is adjacent the walls of the tubes within the extruder. As a result, the column of material that is forced through the extruder has two holes extending therethrough where the tubes 28 were located. The plungers 19 are operated at such a speed as to permit the setting of the material adjacent the walls of the extruder 16 before the material leaves the extruder. When the material leaves the extruder 16 the outside thereof has been set sufficiently to provide a form sustaining wall, whereas the material within is still plastic.

The column of material is constantly pushed forward under the action of the plungers 19 and passes through a heating furnace 30. The furnace 30 may be upwards of 100 feet in length, and the column of extruded material is supported by freely rotatable rollers 31 within the furnace.

When the column of extruded material reaches the end of the furnace 30, it has set sufficiently to permit it to be cut into blocks of suitable length. For this purpose, a cutting mechanism 40 has been shown. While I have shown one form of cutting mechanism, it is to be understood that any standard form of cutting mechanism, of which there are now many on the market, may be used.

The cutting mechanism shown comprises a main shaft 41 driven by a pulley 42 and provided with a pulley 43 belted to a pulley 44 driving a high speed carborundum saw. 45. The saw 45 is mounted on a bracket 46 and is normally maintained out of the path of movement of the extruded material indicated at 47. The shaft 41 is suitably belted to a pulley 48 which, through a clutch 49, is adapted to operate a cam 50 to swing the saw 45 into the path of movement of the moving column 47. A spring 51 maintains the clutch 49 disengaged. As the column of material 47 moves forward it pushes a latch 52 to the left as seen in Fig. 1b and thereby causes the clutch 49 to engage and swing the constantly rotating high speed carborundum saw into the path of movement of the column of material 47. The saw instantly cuts off a portion of the moving column 47. The cut block drops down as indicated at 55 and thereby permits the spring 51 to disengage the clutch 49 and swing the bracket 46 out of the path of movement of the column 47. This action takes place with such rapidity that the moving column 47 to the right of the saw 45 is not appreciably affected during the cutting action, there being enough resiliency in the hundred foot or so length of material that extends back to the extruder and the tampers 19 so that the short period of time that the end of the column 47 is stopped by the carborundum saw does not affect the movement of the column 47 under the action of the tampers 19.

The portion 55 cut from the end of the moving column 47 is then to be carried through a setting solution to render the sodium silicate insoluble, as explained above. The block 55 is prevented from falling into a tank 60 which contains the setting solution by the member 56 which is adapted to be swung downwardly by a link work 61 to permit the block to slide down the guide way 62 into the tank. A rotating conveyor 65 provided with a number of spokes 66 is constantly rotated at a slow speed through the setting solution. At one end of each spoke there is provided a cam surface 67 which, as the spoke moves downward, engages the roller 68 at the end of a crank arm lever 69, forcing the roller 68 downward toward the guide way 62 as shown in dotted lines, and thereby swinging the member 56 counter-clockwise to permit the block 55 to slide down into the setting solution. The block slides into the setting solution and thereafter is moved forward along the guide way 62 by one of the spokes 66 of the conveyor 65. Each of the spokes 66 is provided with a supporting member 70 which, as the spokes rotate out of the tank beyond the horizontal plane, supports a block. It may thus be seen that we have provided a means for passing the block through a setting solution wherein it remains for a definite time. When the block carried by the support 70 engages the finger 75 it slides down the finger and is carried by means of the freely rotatable rollers 76 forming a part of a conveyor 77 to a slowly moving belt 78 which again carries the block through the drying furnace.

Here the block is further dried and thoroughly set. By the time the block reaches the end of the belt 78 shown in Fig. 1a, it is thoroughly set. It is then removed from the belt as a finished product.

As stated above, hot gases are passed through the tubes 28 in order to produce a rapid setting of the material adjacent the tube as the same is pushed forward through the extruder. As the column formed with the holes passes beyond the range of the tubes or pipes 28 the hot air then passes into the holes 27 and permeates through the interstitial spaces in the column of material, the air being retained in these spaces until the column passes beyond the range of the mold or extruder, when the air slowly seeps out from the outer sides of the column of material. Ordinarily, the gas used is air. If desired, the tank 60 containing the setting solution may be omitted and chemical gases could be used to render the sodium silicate of the block insoluble. When this is the case, the gases may be passed through the tubes 28. As stated above, amongst the gases or vapors suitable for such uses may be mentioned chlorine gas, sublimed ammonium chloride or carbon dioxide. These gases may be combined with hot air passing through the pipes or tubes 28.

A section of a block produced by my process is shown in Fig. 6. The block comprises a large number of long thin fibers each coated with the adhesive or cement above described, said fibers being loosely intertwined and bonded together by the adhesive, there being a large number of small air spaces extending throughout the block.

In Fig. 3, there is shown a different type of extruder from that shown in Figs. 4 and 5. The extruder shown in Fig. 3 is particularly adapted for extruding slabs rather than blocks.

This extruder differs from the one shown in Figs. 4 and 5 only in that it is of a different cross section from that shown in Figs. 4 and 5 and also that here the tubes or pipes 28 shown in Figs. 4 and 5 are not present. The extruder 16' tapering outwardly at 20' is of a rectangular cross section and of a width equal to the desired width of the slab to be extruded therethrough. An opening at the bottom of the hopper 15 provides an inlet to the extruder 16' and the tampers or plungers 19 extend through openings in the hopper 15 and, by a reciprocating or plunging movement as heretofore described force the material through the extruder.

Here, as in Figs. 4 and 5, the extruder 16' extends through a hot air chamber through which hot air is circulated for the purpose of heating the walls of the extruder to produce a rapid setting of the extruded material adjacent the walls.

In compliance with the requirements of the patent statutes, we have herein shown and described a preferred embodiment of our invention. Our invention is, however, not limited to the precise embodiment herein disclosed, the same being merely illustrative of the invention. What we consider new and desire to secure by Letters Patent is:

1. In an apparatus for extruding and drying plastic material, a mold open at one end, means for continuously extruding plastic material through the mold whereby the material leaves the mold in the form of a continuous moving column, a drying oven adjacent the mold and through which the column moves, means at the end of the oven for cutting the forward moving column into blocks, a tank containing a setting solution, and means adjacent the oven for conveying the cut blocks to the tank.

2. In an apparatus for extruding and drying plastic material, a mold open at one end, means for continuously extruding plastic material through the mold whereby the material leaves the mold in the form of a continuous moving column, a drying oven adjacent the mold and through which the column moves, means at the end of the oven for cutting the forward moving column into blocks, a tank containing a setting solution, means for conveying the blocks through the tank, and means for conveying the blocks through heating means for further setting the blocks.

3. The method of molding porous blocks which comprises, forming the molding material into the desired shape and passing gases through the pores of the molded material and in contact with the same to accelerate the setting of the material.

4. The method of molding porous blocks which comprises, forming the molding material into the desired shape and passing gases through the molded material from the interior outward to produce a rapid setting of the material.

5. The method of molding porous blocks which comprises, forming the molding material into the desired shape, passing gases through the molded material from the interior outward and heating the outer sides of the molded material to produce a rapid setting of the material.

6. The method of forming fibrous articles which comprises mixing fibers with a cementitious binder, placing the material into a mold to give it the desired shape, said mold being heated to produce a thin form sustaining skin and in then removing the material from the mold while the material within is still plastic and allowing it to set while held together by the sustaining skin.

7. The method of forming molded objects which consists in mixing fibrous material with a cement binder, forming the same in a mold the walls of which are heated to cause a quick setting of the material adjacent the walls to produce a form sustaining skin and removing the object from the mold while the interior has not yet set, said skin preserving the shape of the object during the subsequent setting of the material within.

8. The method of making a molded porous block having a hole therethrough which comprises, extruding the material through a forming mold of the desired cross section, heating the walls of the mold including the core forming walls, to produce a quick setting of the material adjacent the walls, passing hot gases through the hole in the molded material after it has left the extruder to produce a change in the material, and thereafter cutting the molded material into blocks.

9. A method of forming blocks of fibrous material united by cementitious binder which comprises mixing the cementitious material and the binder, molding the mass into a definite shape, hardening sufficient of the mass to cause it to retain the shape of the mold, removing the block from the mold and thereafter hardening the remainder of the mass.

10. The method of forming insulating material which comprises coating vegetable fibers with a cementitious binder, depositing the coated fibers in a loose mass, compressing the mass, and setting the cementitious binder while the mass is under compression by passing hot gases therethrough.

11. The method of forming insulating material which comprises coating vegetable fibers with a cementitious binder depositing the coated fibers in a loose mass, imparting motion to the mass and subsequently compressing it, and setting the cementitious binder by passing hot gases through the mass.

12. The method of forming insulating material which comprises coating vegetable fibers with a cementitious binder depositing the coated fibers in a loose mass, imparting motion to the mass and subsequently compressing it, and setting the cementitious binder by passing hot gases through the mass while it is maintained under compression.

13. The method of forming insulating material which comprises coating vegetable fibers with a cementitious binder, depositing the coated fibers in a loose mass, imparting motion to the mass and subsequently compressing it, and setting the cementitious binder by passing hot gases through the mass while it is moved under compression.

14. The method of forming insulating material which comprises coating vegetable fibers with a cementitious binder, depositing the coated fibers in a loose mass, imparting progressive movement to the mass and subsequently compressing it, and setting the cementitious binder by passing hot gases through the mass while it is moving under compression.

15. In an apparatus for forming insulating material of vegetable fibers, means for coating the vegetable fibers with a cementitious binder, means for receiving the coated fibers in a loose mass, means for imparting motion to the mass and for compressing the mass, and means for passing hot gases through the mass to set the cementitious binder.

16. In an apparatus for forming insulating material of vegetable fibers, means for coating the vegetable fibers with a cementitious binder, means for receiving the coated fibers in a loose mass, means for imparting motion to the mass and for compressing the mass, means for maintaining the moving mass under compression, and means for passing hot gases through the mass to set the cementitious binder.

17. In an apparatus for forming insulating material of vegetable fibers, means for coating the vegetable fibers with a cementitious binder, means for receiving the coated fibers in a loose mass, means for imparting motion to the mass and for compressing the mass, means for maintaining the moving mass under compression, and means for passing hot gases through the mass while it is maintained under compression to set the cementitious binder.

18. The method of forming an article which comprises coating fibers with a cementitious binder, mixing the fibrous material to produce a promiscuously mixed mass, forming the mass into the desired shape, and passing hot gases through the interstices of the mass while the cementitious binder is setting.

19. The method of forming an article which comprises coating fibers with a cementitious binder, mixing the fibrous material to produce a promiscuously mixed mass, forming the mass into the desired shape, heating the exterior of the mass to produce a form sustaining skin, then maintaining the shape of the material by the form sustaining skin and passing hot gases through the interstices of the mass while the cementitious binder is setting.

20. In the manufacture of a porous article comprising a mass of fibers promiscuously intertwined and bonded together by a cementitious binder, the method of accelerating the setting of the binder which comprises passing gases through the interstices in the mass of setting material.

In witness whereof, we hereunto subscribe our names this 11th day of October, 1928.

CASS L. KENNICOTT.
HERBERT LIBBERTON.